US011870973B2

(12) United States Patent
Baltz et al.

(10) Patent No.: US 11,870,973 B2
(45) Date of Patent: Jan. 9, 2024

(54) CAMERA CALIBRATION TOOL

(71) Applicant: DEERE & COMPANY, Moline, IL (US)

(72) Inventors: Nicholas C. Baltz, Port Byron, IL (US); Ashraf Qadir, Ankeny, IA (US); Adam J. Royal, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 133 days.

(21) Appl. No.: 17/443,487

(22) Filed: Jul. 27, 2021

(65) Prior Publication Data

US 2023/0031978 A1 Feb. 2, 2023

(51) Int. Cl.
*H04N 17/00* (2006.01)
*G01B 11/00* (2006.01)
*H04N 23/90* (2023.01)
*G01B 11/275* (2006.01)

(52) U.S. Cl.
CPC ......... *H04N 17/002* (2013.01); *G01B 11/002* (2013.01); *H04N 23/90* (2023.01); B60R 2300/402 (2013.01); G01B 11/2755 (2013.01); G01B 2210/12 (2013.01); G01B 2210/30 (2013.01); G01B 2210/303 (2013.01)

(58) Field of Classification Search
CPC ............ G01B 11/2755; G01B 2210/12; G01B 2210/30; G01B 2210/303; B60R 2300/402; H04N 23/90; H04N 17/02; H01B 11/002
USPC ....................................... 73/1.42; 356/139.09
See application file for complete search history.

(56) References Cited

U.S. PATENT DOCUMENTS

| 6,594,600 | B1 * | 7/2003 | Arnoul ...................... G06T 7/85 |
| | | | 702/94 |
| 7,739,861 | B2 | 6/2010 | Mackin |
| 8,638,452 | B2 * | 1/2014 | Muhle ................... G01B 11/25 |
| | | | 356/615 |
| 9,212,907 | B2 * | 12/2015 | D'Agostino ....... G01B 11/2755 |
| 9,301,446 | B2 | 4/2016 | Peters |
| 9,491,451 | B2 | 11/2016 | Pliefke |
| 10,438,081 | B2 | 10/2019 | Kwon et al. |

(Continued)

FOREIGN PATENT DOCUMENTS

| CN | 104460361 A | * 3/2015 | ........... A01B 59/062 |
| DE | 102016202628 A1 | 8/2017 | |

(Continued)

OTHER PUBLICATIONS

Translation JP-2017173059-A (Year: 2017).*

(Continued)

*Primary Examiner* — Mischita L Henson
*Assistant Examiner* — Monica S Young
(74) *Attorney, Agent, or Firm* — Taft Stettinius & Hollister LLP; Stephen F. Rost

(57) ABSTRACT

A camera calibration tool for calibrating one or more cameras of a mobile machine comprising calibration targets and a net. Each of the calibration targets comprises identifiable indicia. The net is adapted to be coupled to the mobile machine. The net has one or more configurations that define predetermined target locations, with location markers, in a predetermined layout. The calibration targets are positioned respectively at the predetermined target locations in the predetermined layout to calibrate the one or more cameras by use of the calibration targets.

15 Claims, 8 Drawing Sheets

(56) References Cited

U.S. PATENT DOCUMENTS

| | | | |
|---|---|---|---|
| 10,757,859 B2 | 9/2020 | Dima et al. | |
| 2004/0049930 A1* | 3/2004 | Murray | G01B 11/27 33/288 |
| 2010/0321674 A1* | 12/2010 | Corghi | G01B 11/2755 356/139.09 |
| 2015/0305238 A1 | 10/2015 | Klausmann et al. | |
| 2017/0082442 A1 | 3/2017 | Anderson | |
| 2018/0084708 A1 | 3/2018 | Neitemeier et al. | |
| 2018/0188022 A1* | 7/2018 | Leikert | G01B 11/2755 |
| 2018/0300901 A1* | 10/2018 | Wakai | G06T 7/73 |
| 2018/0372467 A1* | 12/2018 | Yokoyama | G01B 3/04 |
| 2019/0098221 A1* | 3/2019 | Troy | H04N 7/18 |
| 2019/0249985 A1* | 8/2019 | Stieff | G01S 7/4972 |
| 2019/0307070 A1 | 10/2019 | Dima et al. | |
| 2019/0327889 A1 | 10/2019 | Borgstadt | |
| 2019/0331482 A1* | 10/2019 | Lawrence | G01S 7/4026 |
| 2020/0068804 A1 | 3/2020 | Barther et al. | |
| 2020/0084965 A1 | 3/2020 | Neitemeier et al. | |
| 2020/0141724 A1* | 5/2020 | Lawrence | G01B 11/272 |
| 2020/0273206 A1* | 8/2020 | Corghi | G01S 7/4972 |
| 2021/0289701 A1 | 9/2021 | White et al. | |
| 2022/0191468 A1* | 6/2022 | Kolberg | H04N 17/002 |

FOREIGN PATENT DOCUMENTS

| | | | |
|---|---|---|---|
| DE | 102016118227 A1 | | 3/2018 |
| DE | 102016118237 A1 | | 3/2018 |
| DE | 102017129193 A1 | | 6/2019 |
| DE | 102019111089 A1 | | 11/2020 |
| DE | 102022201279 B3 | * | 12/2022 |
| EP | 2681984 B1 | | 1/2016 |
| EP | 3150055 A1 | | 4/2017 |
| EP | 3299995 A1 | | 3/2018 |
| EP | 3299996 A1 | | 3/2018 |
| EP | 3514758 A1 | * | 7/2019 |
| EP | 3552474 A1 | | 10/2019 |
| JP | 2017009462 A | * | 1/2017 |
| JP | 2017173059 A | * | 9/2017 |
| JP | 6627275 B2 | * | 1/2020 |
| KR | 20210007701 A | * | 1/2021 |
| WO | 2014093794 A1 | | 6/2014 |
| WO | 2014093814 A1 | | 6/2014 |
| WO | WO2021004414 A1 | | 1/2021 |

OTHER PUBLICATIONS

Translation KR 20210007701 (Year: 2021).*
Translation CN-104460361 (Year: 2015).*
Translation JP-6627275-B2 (Year: 2020).*
Translation JP-2017009462-A (Year: 2017).*
Calibration—Camera (Dec. 7, 2020) (8 pages). Retrieved from the Internet <URL: https://docs.duckietown.org/daffy/opmanual_duckiebot/out/camera_calib.html>.
Dengqing Tang et al. "AprilTag array-aided extrinsic calibration of camera-laser multi-sensor system, Robotics and Biomimetics." Robotics and Biomimetics, 3:13 (Dated: 2016) (9 pages). DOI 10.1186/s40638-016-0044-0. Retrieved from the Internet <URL: https://jrobio.springeropen.com/track/pdf/10.1186/s40638-016-0044-0.pdf?site=jrobio.springeropen.com>.

* cited by examiner

CAMERA CALIBRATION TOOL

FIELD OF THE DISCLOSURE

The present disclosure relates to a calibration tool for calibrating one or more cameras.

BACKGROUND OF THE DISCLOSURE

Some mobile machines may include onboard imaging systems with one or more cameras. The imaging system can be used for a wide variety of purposes. The cameras can be calibrated for proper functioning.

SUMMARY OF THE DISCLOSURE

According to an aspect of the present disclosure, there is disclosed a camera calibration tool for calibrating one or more cameras of a mobile machine. The camera calibration tool comprises calibration targets and a net. Each of the calibration targets comprises identifiable indicia. The net is adapted to be coupled to the mobile machine. The net comprises location markers and has one or more configurations that define predetermined target locations, with the location markers, in a predetermined layout. The calibration targets are positioned respectively at the predetermined target locations in the predetermined layout to calibrate the one or more cameras by use of the calibration targets.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
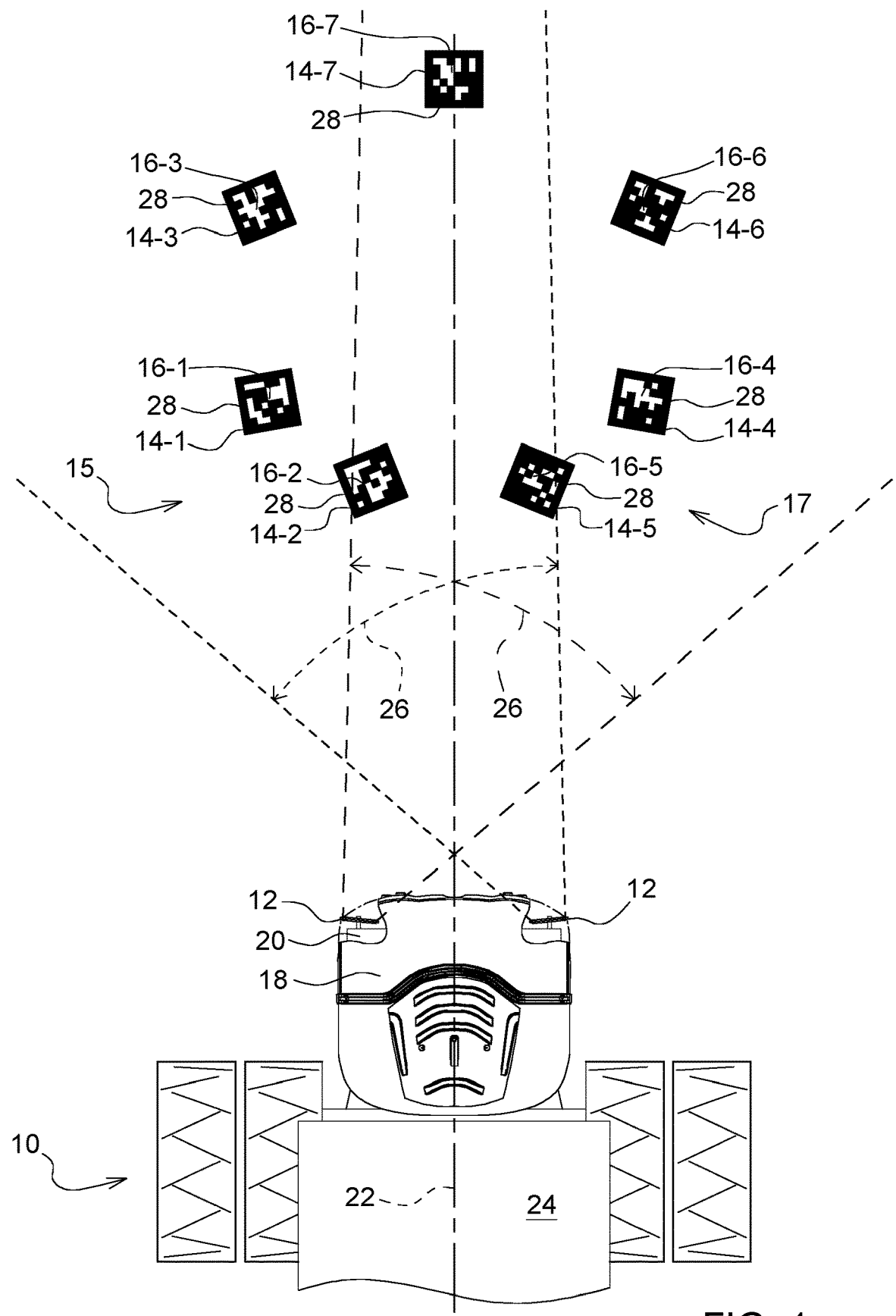
FIG. 1 is a top plan view showing calibration targets positioned at predetermined target locations in a predetermined layout for calibrating one or more cameras.
Figure 2:
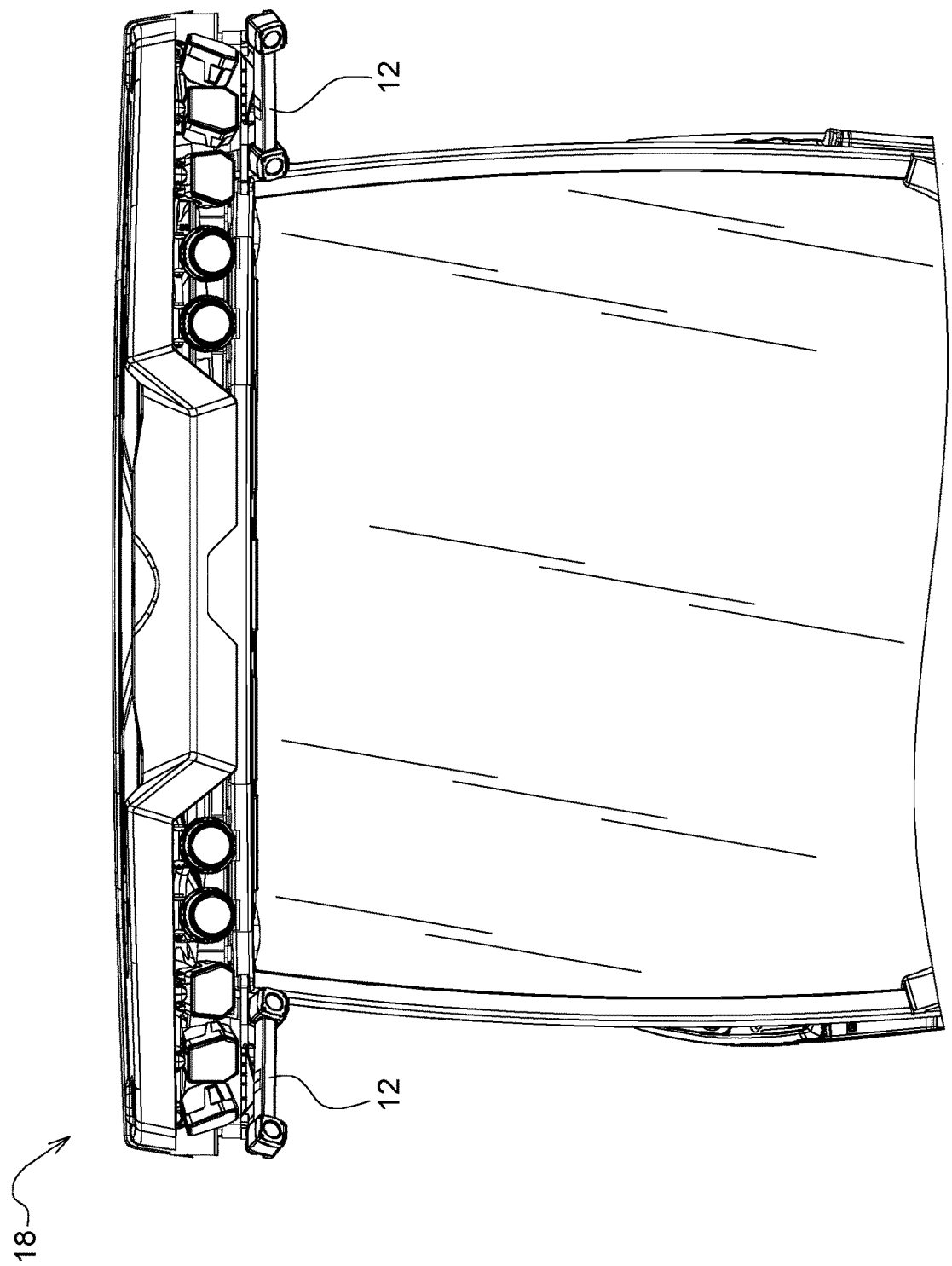
FIG. 2 is a front elevational view showing an operator's station of a machine, configured, for example, as a combine harvester, with a pair of stereo cameras mounted to the operator's station.

Referring to FIGS. 1 and 2, a mobile machine 10 has one or more onboard cameras 12 that can be calibrated by use of calibration targets 14 included in a camera calibration tool 15. The calibration targets 14 are arranged in respective predetermined target locations 16 in a predetermined layout 17. The machine 10 can take the form of a wide variety of mobile machines, such as, for example, an agricultural, construction, forestry, or turf mobile machine, to name but a few.

Illustratively, the machine 10 is configured as a self-propelled combine harvester for threshing and separating grain from residual crop material. In such a case, the machine 10 may include an operator's station 18 and a feederhouse 20. An operator can operate the machine 10 from the operator's station 18. In the illustrated example, the machine 10 has two cameras 12 coupled to the operator's station 18 laterally on either side of a fore-aft axis 22 of the machine 10 for taking optical images of the field in front of the machine 10 in a forward direction of travel as part of a forward-looking perception system of the machine 10. The first or right camera 12 may be positioned to the right of the fore-aft axis 22, and the second or left camera 12 may be positioned to the left of the fore-aft axis 22. An agricultural header (not shown) receives and advances crop material to the feederhouse 20. The feederhouse 20 receives the crop material into a body 24 of the machine 10 for processing thereby. The agricultural header is removed from the feederhouse 20 during calibration of the cameras 12.

Each camera 12 has a field of view 26. For example, the first camera 12 has a first field of view 26, and the second camera 12 has a second field of view 26. One or more of the targets 14 (e.g., four or five targets) are positioned in the first field of view 26 of the first camera 12, and one or more of the targets 14 (e.g., four or five targets) are positioned in the second field of view 26 of the second camera 12. The fields of view 26 overlap one another such that one or more of the calibration targets 14 (e.g., two or three targets 14) may be positioned within the fields of view 26 of both cameras 12.

Each camera 12 may be configured, for example, as a stereo camera. Each stereo camera may include two cameras mounted to a common support so as to be positioned at a known separation distance from one another.

Each calibration target 14 includes identifiable indicia 28. The identifiable indicia 28 of each target 14 is unique to that target 14. In an example, each calibration target 14 is an April tag, which may include a two-dimensional barcode as its identifiable indicia 28. The calibration targets 14 face generally toward the mobile machine 12 so that their identifiable indicia 28 are within the field of view 26 of the respective cameras 12 for use with the camera calibration program onboard the mobile machine 12. Once the targets 14 are positioned in their predetermined target locations 16, the camera calibration program can be executed.

Figure 3:
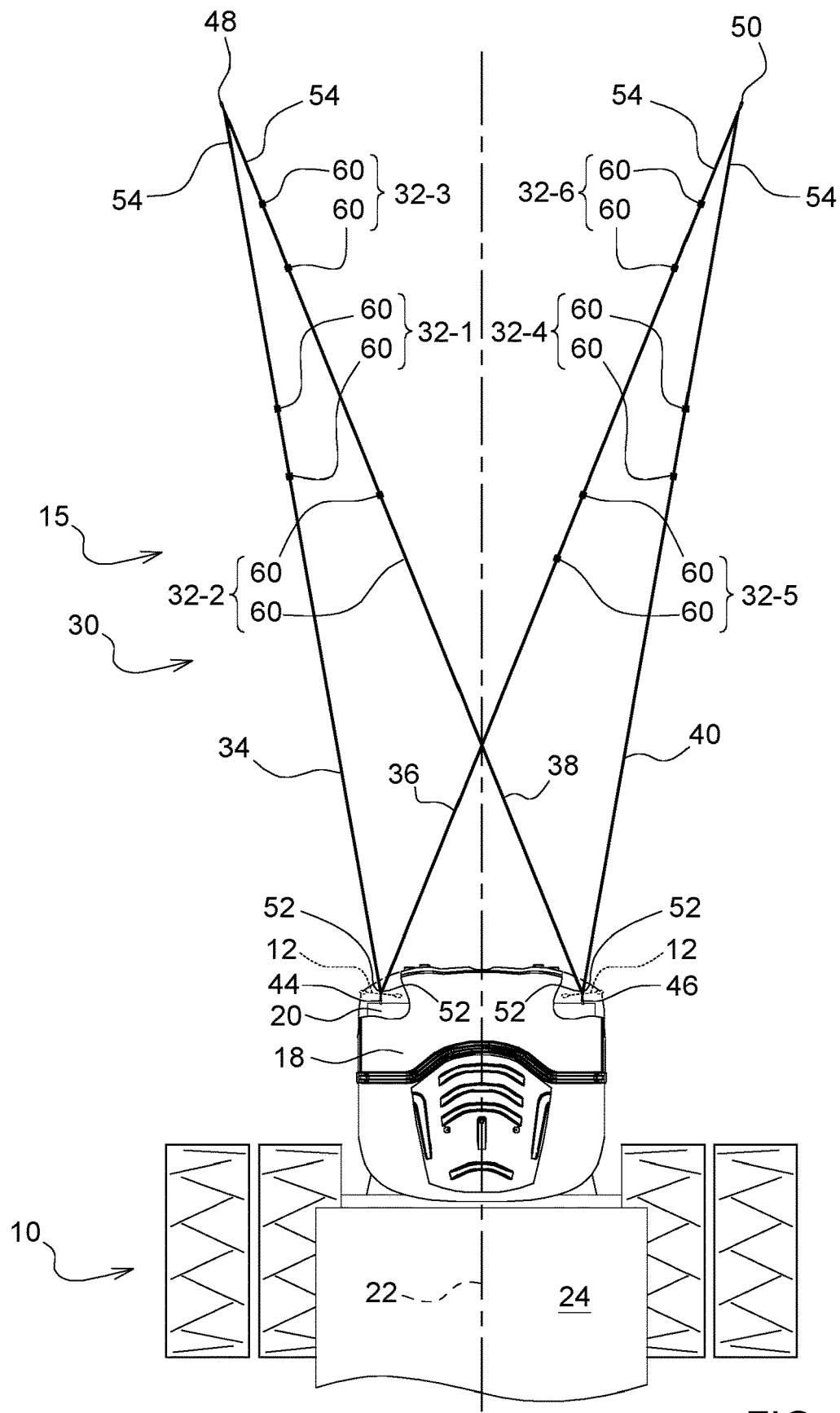
FIG. 3 is a top plan view showing a net arranged in a first configuration that defines predetermined target locations with associated location markers.

Referring to FIG. 3, the calibration tool 15 includes a net 30 to position the targets 14 in their respective predetermined target locations 16 in the predetermined layout 17 before the calibration program is run. The net 30 is adapted to be coupled, and is coupled, to the machine 10 for target set-up. For example, in the case of a combine harvester, the net 30 may be adapted to be coupled, and may be coupled, to the feederhouse 20. The net 30 has one or more configurations defining the predetermined target locations 16, with location markers 32 of the net 30, in the predetermined layout 17. The targets 14 are positioned respectively at the predetermined target locations 16, marked by the location markers 32, in the predetermined layout 17 to calibrate the one or more cameras 12 by use of the targets 14.

Illustratively, the net 30 has two configurations, a first configuration (FIGS. 3 and 4) and a second configuration (FIG. 8), for defining the target locations 16. The net 30 defines one or more of the predetermined target locations 16 (e.g., six) when the net 30 is arranged in the first configuration, and defines one or more of the predetermined target locations 16 (e.g., one) when the net 30 is arranged in the second configuration. One or more of the calibration targets are positioned at the one or more of the predetermined target locations defined by the net 30 in the first configuration, one or more of the calibration targets are positioned at the one or more of the predetermined target locations defined by the net 30 in the second configuration. In other embodiments, the net 30 may have only one configuration, or more than two configurations, for defining the target locations.

Figure 4:
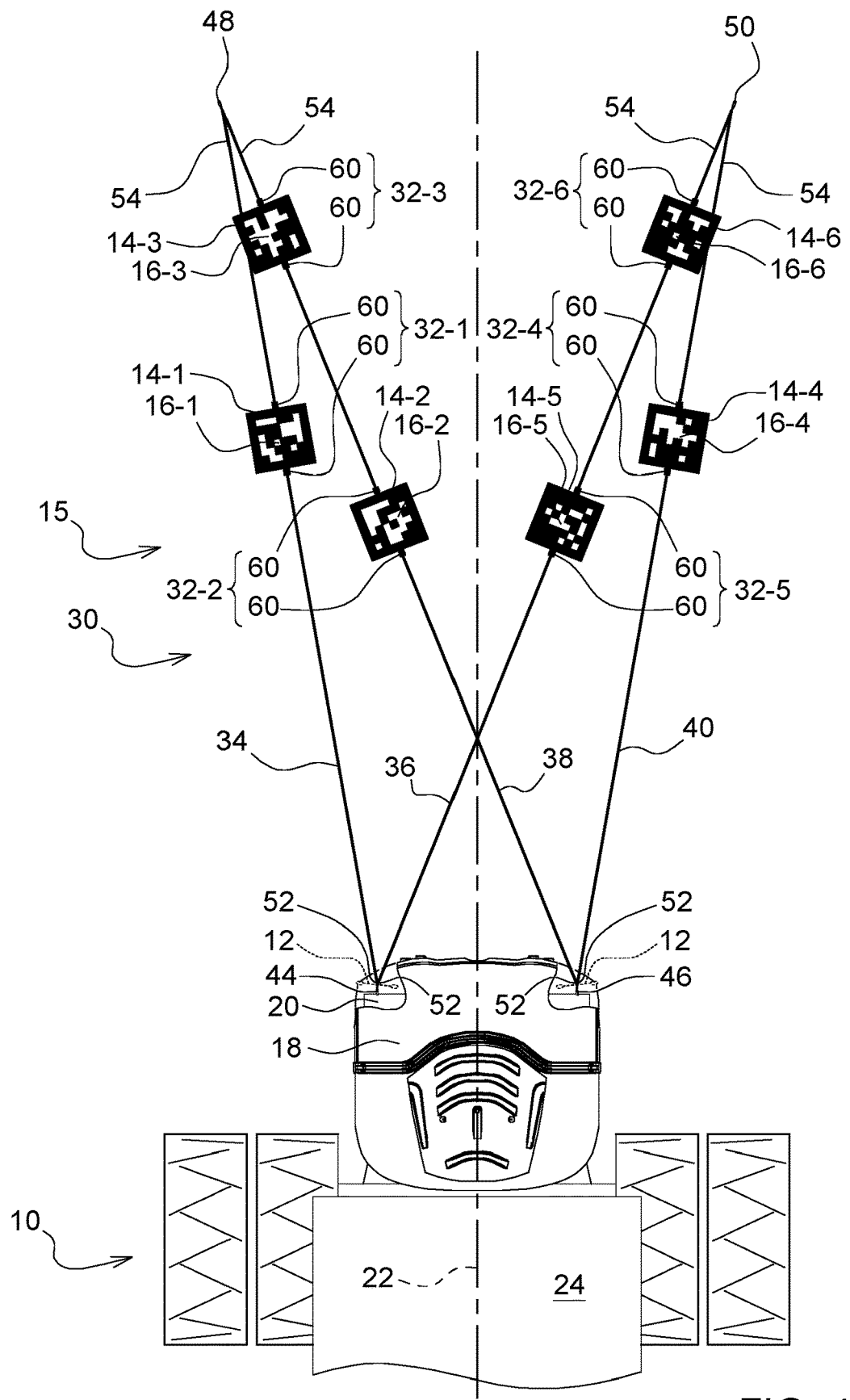
FIG. 4 is a top plan view showing the net arranged in the first configuration and calibration targets positioned respectively at the predetermined target locations defined by the first configuration.
Figure 5:
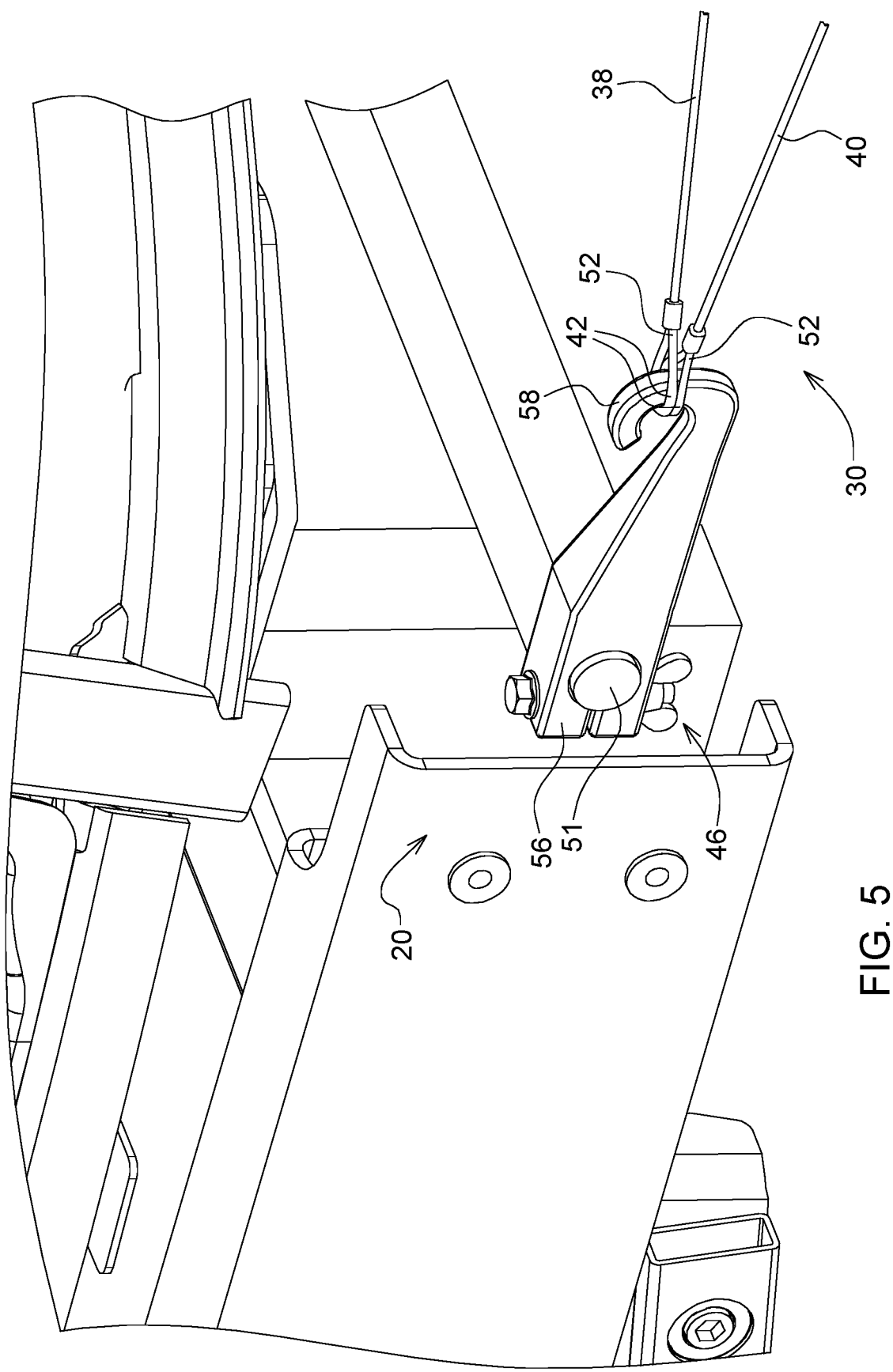
FIG. 5 is a perspective view showing an anchor of the net coupled to the machine and first ends of two lines of the net coupled to the anchor.
Figure 6:
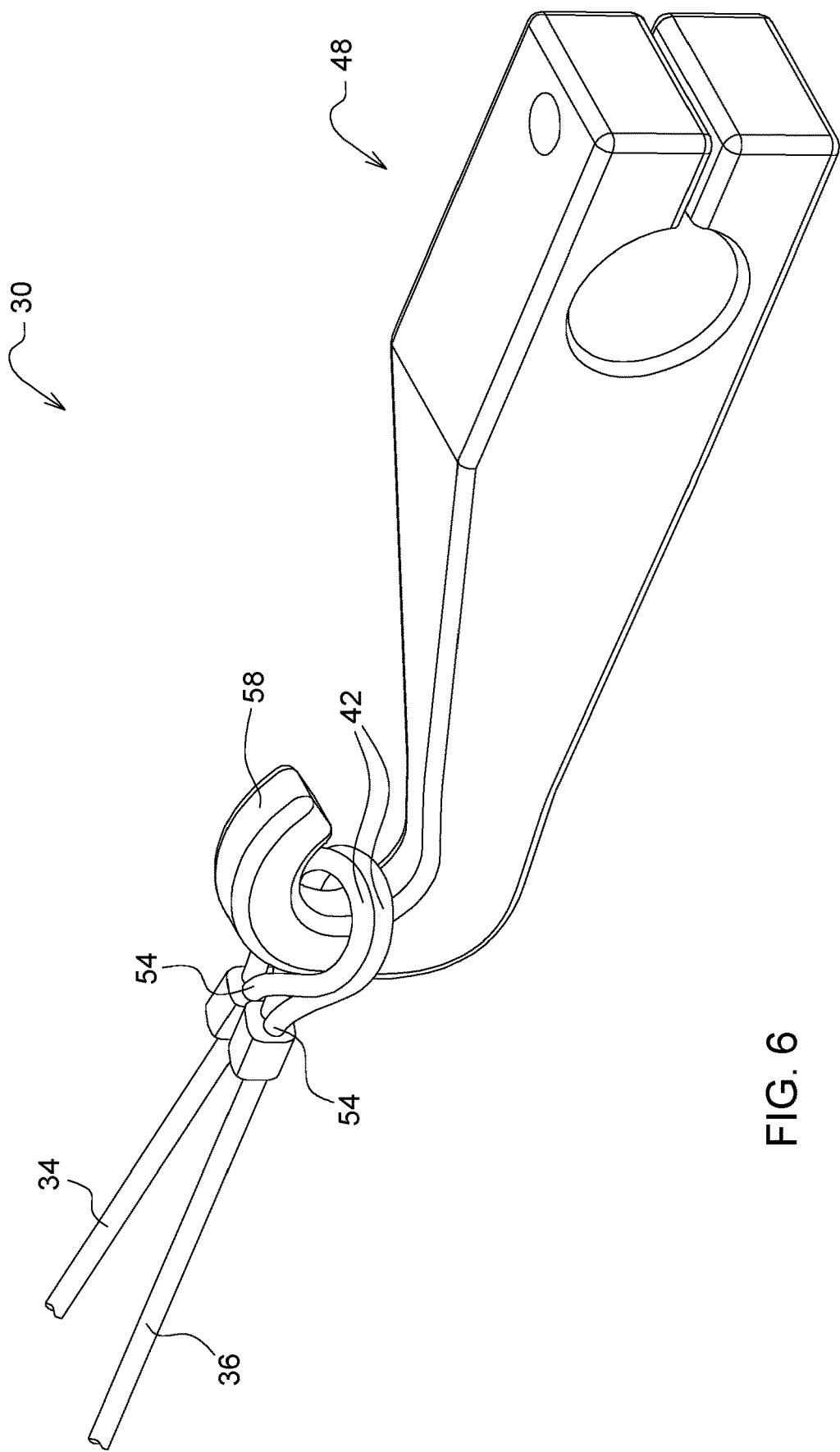
FIG. 6 is a perspective view showing an anchor of the net coupled to second ends of two lines of the net.

Referring to FIGS. 3 and 4, the net 30 includes a number of lines and a number of anchors. With respect to the lines, the net 30 includes, for example, a first line 34, a second line 36, a third line 38, and a fourth line 40. Each line 34, 36, 38, and 40 is configured, for example, as a cable with a loop 42 at each end (FIGS. 5 and 6). With respect to the anchors, the net 30 includes, for example, a first anchor 44, a second anchor 46, a third anchor 48, and a fourth anchor 50. The first anchor 44 is adapted to be coupled, and is coupled, to the machine 10, and the second anchor 46 is adapted to be coupled, and is coupled, to the machine 10. In the case of a combine harvester, the first anchor 44 may be adapted to be coupled, and may be coupled, to a first lock pin 51 of the feederhouse 20, and the second anchor 46 may be adapted to be coupled, and may be coupled, to a second lock pin 51 of the feederhouse 20 on an opposite side thereof, the lock pins 51 for coupling to a header during use of the combine harvester, as shown, for example, with respect to the second lock pin 51 in FIG. 5. The lines 34, 36, 38, 40 and the anchors 44, 46, 48, 40 may be configured in a wide variety of ways.

In the first configuration, the first and second lines 34, 36 are coupled to the first anchor 44, and the third and fourth lines 38, 40 are coupled to the second anchor 46. A first end 52 of the first line 34 and a first end 52 of the second line 36 are coupled to the first anchor 44, and a first end 52 of the third line 38 and a first end 52 of the fourth line 40 are coupled to the second anchor 46. A second end 54 of the first line 34 and a second end 54 of the third line 38 are coupled to the third anchor 48, and a second end 54 of the second line 36 and a second end 54 of the fourth line 40 are coupled to the fourth anchor 50. The third line 38 and the fourth line 40 criss-cross one another so as to intersect one another.

Referring to FIG. 5, each of the first and second anchors 44, 46 includes, for example, a clamp 56 and a hook 58, as shown, for example, with respect to the second anchor 46. Each clamp 56 is adapted to be coupled, and is coupled, to the machine 10. The clamp 56 includes, for example, an upper jaw, a lower jaw, a bolt extending through the upper and lower jaws, and a nut (e.g., a wing nut) to tighten the jaws onto a respective portion of the machine 10, such as, for example, the respective lock pin 51 of the feederhouse 20 in the case of a combine harvester. Illustratively, the jaws of the clamp 56 and the hook 58 are integrated into a monolithic structure.

Each of the first ends 52 of the lines 34, 36, 38, 40 includes a loop 42, as shown, for example, with respect to the third and fourth lines 38, 40 in FIG. 5. The loops 42 of the first ends 52 of the first and second lines 34, 36 are received on the hook 58 of the first anchor 44, and the loops 42 of the first ends 52 of the third and fourth lines 38, 40 are received on the hook 58 of the second anchor 44, as shown, for example, with respect to the second anchor 44 in FIG. 5.

Referring to FIG. 6, the third and fourth anchors 48, 50 may be configured as any suitable weighted device for anchoring the second ends 54 of the lines 34, 36, 38, 40 in place. For example, each of the third and fourth anchors 48, 50 may be configured in a manner similar to the first and second anchors 44, 46, without the bolt and nut, as shown, for example, with respect to the third anchor 48 in FIG. 6. In such a case, each of the third and fourth anchors 48, 50 includes a hook 58.

Each of the second ends 54 of the lines 34, 36, 38, 40 includes a loop 42, as shown, for example, with respect to the first and third lines 34, 38 in FIG. 6. The loops 42 of the second ends 54 of the first and third lines 34, 38 are received on the hook 58 of the third anchor 48, and the loops 42 of the second ends 54 of the second and fourth lines 36, 40 are received on the hook 58 of the fourth anchor 50, as shown, for example, with respect to the third anchor 48 in FIG. 6.

Figure 7:
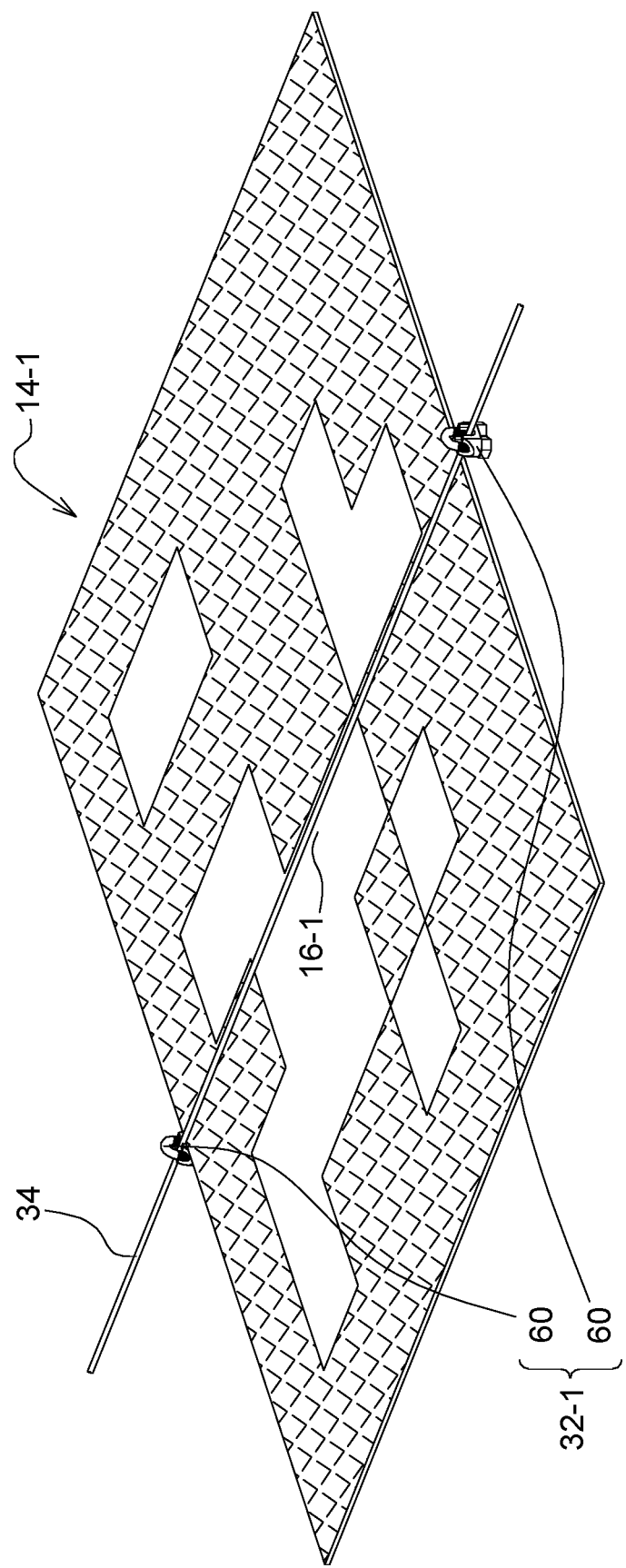
FIG. 7 is a perspective view showing a calibration target positioned at a predetermined target location marked by a location marker coupled to a line of the net.

Referring to FIGS. 4, 6, and 7, the net 30 includes location markers 32 that mark the predetermined target locations 16 for targets 14. The location markers 32 may be configured in a wide variety of ways. For example, line-intermediate location markers 32-1, 32-2, 32-3, 32-4, 32-5, 32-6 of the line markers 32 are configured to define line-intermediate target locations 16-1, 16-2, 16-3, 16-4, 16-5, 16-6 of the target locations 16 positioned along lines 34, 36, 38, 40 between first and second ends 52, 54 thereof. The line marker 32-1 is coupled to the line 34 so as to define the target location 16-1 for the target 14-1 of the targets 14 along the line 34 between its end 52, 54. The line marker 32-2 is coupled to the line 34 so as to define the target location 16-2 for the target 14-2 of the targets 14 along the line 36 between its ends 52, 54. The line marker 32-3 is coupled to the line 36 so as to define the target location 16-3 for the target 14-3 of the targets 14 along the line 36 between its ends 52, 54, such that the line marker 32-3, the target location 16-3, and the target 14-3 are spaced apart from the line marker 32-2, the target location 16-2, and the target 14-2, respectively. The line marker 32-4 is coupled to the line 40 so as to define the target location 16-4 for the target 14-4 of the targets 14 along the line 40 between its end 52, 54. The line marker 32-5 is coupled to the line 38 so as to define the target location 16-5 for the target 14-5 of the targets 14 along the line 38 between its ends 52, 54. The line marker 32-6 is coupled to the line 38 so as to define the target location 16-6 for the target 14-6 of the targets 14 along the line 38 between its ends 52, 54, such that the line marker 32-6, the target location 16-6, and the target 14-6 are spaced apart from the line marker 32-5, the target location 16-5, and the target 14-5, respectively.

Each line-intermediate location marker 32-1, 32-2, 32-3, 32-4, 32-5, 32-6 includes, for example, two cable clamps 60 coupled to the respective line 34, 36, 38, 40, as shown, for example, in FIG. 7 with respect to the line-intermediate location marker 32-1 with its two cable clamps 60 coupled to the line 34. The two cable clamps 60 of each line-intermediate location marker 32-1, 32-2, 32-3, 32-4, 32-5, 32-6 are spaced apart from one another along the respective line 34, 36, 38, 40 to define a gap therebetween as the respective target location 16-1, 16-2, 16-3, 16-4, 16-5, 16-6. Each target 14-1, 14-2, 14-3, 14-4, 14-5, 14-6 is placed under the respective line 34, 36, 38, 40 in the gap between the cable clamps 60 at the respective target location 16-1, 16-2, 16-3, 16-4, 16-5, 16-6 to properly position the target 14-1, 14-2, 14-3, 14-4, 14-5, 14-6 for use in calibration of the cameras 12. After the targets 14-1, 14-2, 14-3, 14-4, 14-5, 14-6 are put in place, the net 30 can be re-configured to assume the second configuration, in order to position the target 14-7 in the target location 16-7.

Figure 8:
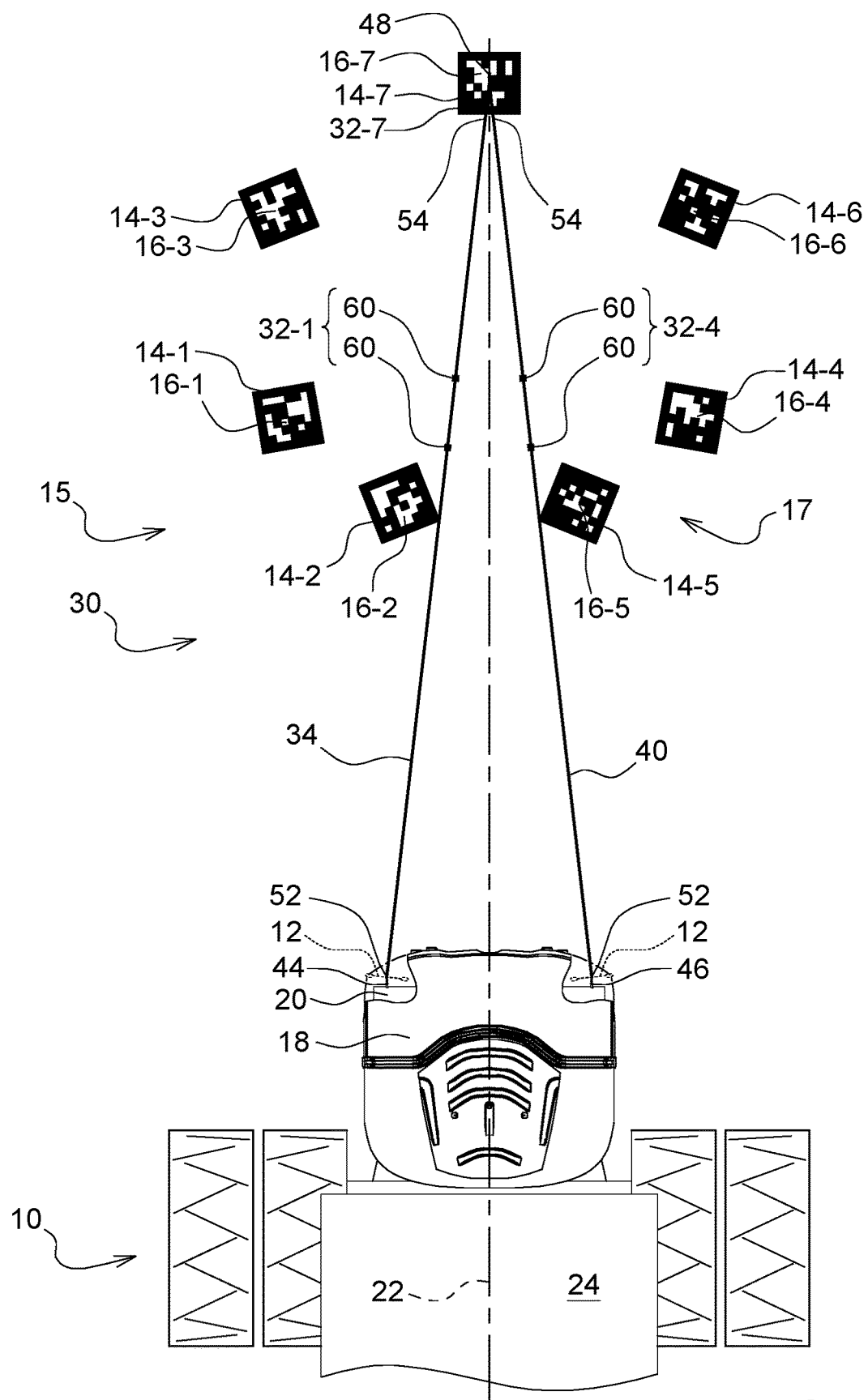
FIG. 8 is a top plan view showing two lines of the net arranged in a second configuration and a calibration target positioned at a predetermined target location defined by the second configuration.

Referring to FIG. 8, the second configuration of the net 30 is shown. In the second configuration, the first and fourth lines 34, 40 are used, and the second and third lines 36, 38 can be moved out of the way. For example, the second and third lines 36, 38 can be detached from the first and second anchors 44, 46, or they can remain attached to the anchors 44, 46 and generally folded toward the feederhouse 20 so as to be temporarily stored between the first and fourth lines 34, 40 when the first and fourth lines 34, 40 are re-positioned into the second configuration.

In the second configuration, the first and fourth lines 34, 40 are coupled respectively to the first and second anchors 44, 46. The first end 52 of the first line 34 is coupled to the first anchor 44, and the first end 52 of the fourth line 40 is coupled to the second anchor 46. The loop 42 of the first end 52 of the first line 34 is received on the hook 58 of the first anchor 44, and the loop 42 of the first end 52 of the fourth line 40 is received on the hook 58 of the second anchor 44.

The first and fourth lines 34, 40 are coupled respectively to an anchor. The second end 54 of the first line 34 and the second end 54 of the fourth line 40 are coupled to the third anchor 48, the fourth anchor 50, or another anchor to provide a location marker 32-7 of the location markers 32 marking the predetermined location 16-7 of the predetermined locations 16 at which the target 14-7 of the calibration targets 14 is positioned. To take an example, the second end 54 of the first line 34 and the second end 54 of the fourth line 40 is coupled to the third anchor 48 to so provide the location marker 32-7. The loops 42 of the second ends 54 of the first and fourth lines 34, 40 are received on the hook 58 of the third anchor 48, in a manner similar to what is shown, for example, with respect to the third anchor 48 in FIG. 6. In such a case, the loops 42 of the second ends 54 of the first and fourth lines 34, 40 and the hook 58 of the third anchor 48 cooperate to define the location marker 32-7 marking the location 16-7, and the center of the target 14-7 is placed under those loops 42 and clamp 58 at the location 16-7.

The anchor for anchoring the second ends 54 of the first and fourth lines 34, 40 in place at the location 16-7 may be configured as any suitable weighted device. As alluded to above, the anchor may take the form of the third anchor 48 or the fourth anchor 50, but without the associated bolt and nut.

The first and second configurations of the net 30 are used to mark the predetermined locations 16-1, 16-2, 16-3, 16-4, 16-5, 16-6, 16-7 with the location markers 32-1, 32-2, 32-3, 32-4, 32-5, 32-6, 32-7 in order to position the targets 14-1, 14-2, 14-3, 14-4, 14-5, 14-6, 14-7 in those locations 16-1, 16-2, 16-3, 16-4, 16-5, 16-6, 16-7, respectively. The first configuration marks the target locations 16-1, 16-2, 16-3, 16-4, 16-5, 16-6 with the location markers 32-1, 32-2, 32-3, 32-4, 32-5, 32-6 for the targets 14-1, 14-2, 14-3, 14-4, 14-5, 14-6, and the second configuration marks the target location 16-7 with the location marker 32-7 for the target 14-7. Once the targets 14-1, 14-2, 14-3, 14-4, 14-5, 14-6, 14-7 are put in place at the locations 16-1, 16-2, 16-3, 16-4, 16-5, 16-6, 16-7, the cameras 12 can be calibrated.

As alluded to above, the net 30 may be arranged in other ways. For example, it may have only one configuration, or it may have more than two configurations, for defining the predetermined target locations for the targets.

In a non-limited example of a single configuration of the net 30, the net 30 may have five lines, with the first four lines arranged in manner similar to the first configuration described herein. The fifth line is coupled at one end to the third anchor, to which the second ends of the second and fourth lines are also coupled, and at the other end to the fourth anchor, to which the second ends of the first and third lines are also coupled. The calibration tool may have eight targets, with a first target at a line-intermediate target location along the first line, a second target at a line-intermediate target location along the fourth line, a third target at the third anchor, a fourth target at the fourth anchor, a fifth target centered at the intersection of the second and third lines, a sixth target at a line-intermediate target location along the second line between the fourth and fifth targets, a seventh target at a line-intermediate target location along the third line between the third and fifth targets, and an eighth target at a midpoint of the fifth line, the fifth and eighth targets aligned on a central fore-aft axis of the combine harvester.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A camera calibration tool for calibrating one or more cameras of a mobile machine, comprising:
   a plurality of calibration targets, each calibration target comprising identifiable indicia, and
   a net adapted to be coupled to the mobile machine, the net comprising a plurality of location markers, the net comprising one or more lines to which the plurality of location markers are coupled via a plurality of cable clamps, the net having one or more configurations that together with the plurality of location markers define a plurality of predetermined target locations in a predetermined layout, wherein the plurality of calibration targets positioned respectively at the plurality of predetermined target locations that include the respective location markers in the predetermined layout to calibrate the one or more cameras by use of the calibration targets.

2. The camera calibration tool of claim 1, wherein the calibration targets comprise April tags.

3. The camera calibration tool of claim 1, wherein the net comprises an anchor adapted to be coupled to the mobile machine.

4. The camera calibration tool of claim 3, wherein the anchor comprises a clamp adapted to be coupled to the mobile machine.

5. The camera calibration tool of claim 1, wherein each line comprises a cable.

6. The camera calibration tool of claim 1, wherein the net comprises a first anchor adapted to be coupled to the mobile machine and a second anchor adapted to be coupled to the mobile machine, at least one of the lines is coupled to the first anchor, and at least one of the lines is coupled to the second anchor.

7. The camera calibration tool of claim 1, wherein the net defines one or more of the predetermined target locations when the net is arranged in a first configuration of the one or more configurations and defines one or more of the predetermined target locations when the net is arranged in a second configuration of the one or more configurations.

8. The camera calibration tool of claim 7, wherein:
   the net comprises a first anchor adapted be coupled to the mobile machine, a second anchor adapted to be coupled to the mobile machine, a third anchor, a fourth anchor, a first line, a second line, a third line, and a fourth line, one or more of the location markers coupled to the first line, the second line, the third line, and the fourth line and defining a number of the predetermined target locations, in the first configuration a first end of the first line and a first end of the second line are coupled to the first anchor, a first end of the third line and a first end of the fourth line are coupled to the second anchor, a second end of the first line and a second end of the third line are coupled to the third anchor, a second end of the second line and a second end of the fourth line are coupled to the fourth anchor, and the third line and the fourth line intersect one another, and in the second configuration the first end of the first line is coupled to the first anchor, the first end of the fourth line is coupled to the second anchor, and the second end of the first line and the second end of the fourth line are coupled to the third anchor, the fourth anchor, or another anchor.

9. A combination comprising the camera calibration tool of claim 1 and a mobile machine, wherein the mobile machine comprises one or more cameras, and the net is coupled to the mobile machine and defines one or more of the predetermined target locations with one or more of the location markers when the net is arranged in a configuration of the one or more configurations, one or more of the calibration targets positioned at the one or more of the predetermined target locations.

10. The combination of claim 9, wherein the mobile machine comprises a first camera having a first field of view and a second camera having a second field of view, one or more of the calibration targets positioned in the first field of view of the first camera, and one or more of the calibration targets positioned in the second field of view of the second camera.

11. The combination of claim 9, wherein the net comprises an anchor coupled to the mobile machine, a line coupled to the anchor, and one or more of the location markers coupled to the line and defining one or more of the predetermined target locations.

12. The combination of claim 9, wherein:

the net comprises a first anchor coupled to the mobile machine, a second anchor coupled to the mobile machine, a third anchor, a fourth anchor, a first line, a second line, a third line, and a fourth line, in the configuration a first end of the first line and a first end of the second line are coupled to the first anchor, a first end of the third line and a first end of the fourth line are coupled to the second anchor, a second end of the first line and a second end of the third line are coupled to the third anchor, a second end of the second line and a second end of the fourth line are coupled to the fourth anchor, and the third line and the fourth line intersect one another, one or more of the location markers coupled to each of the first line, the second line, the third line, and the fourth line with a corresponding one of the calibration targets positioned at each of those location markers.

13. The combination of claim 12, wherein:

the configuration is a first configuration, the one or more configurations has a second configuration, and in the second configuration the first end of the first line is coupled to the first anchor, the first end of the fourth line is coupled to the second anchor, and the second end of the first line and the second end of the fourth line are coupled to the third anchor, the fourth anchor, or another anchor to provide one of the location markers at which one of the calibration targets is positioned.

14. The combination of claim 9, wherein the mobile machine comprises a combine harvester, the combine harvester comprises a feederhouse, and the net is coupled to the feederhouse.

15. The combination of claim 14, wherein the net comprises a first anchor coupled to a first lock pin of the feederhouse and a second anchor coupled to a second lock pin of the feederhouse.

\* \* \* \* \*